US005128542A

United States Patent [19]

Yates et al.

[11] Patent Number: 5,128,542

[45] Date of Patent: Jul. 7, 1992

[54] METHOD OF OPERATING AN ION TRAP MASS SPECTROMETER TO DETERMINE THE RESONANT FREQUENCY OF TRAPPED IONS

[75] Inventors: Nathan A. Yates, Alachua County, Fla.; Stephen C. Bradshaw, Monterey County, Calif.; Richard A. Yost, Alachua County, Fla.; David B. Tucker, Santa Clara County, Calif.

[73] Assignee: Finnigan Corporation, San Jose, Calif.

[21] Appl. No.: 645,648

[22] Filed: Jan. 25, 1991

[51] Int. Cl.[5] ....................... H01J 49/42; B01D 59/44

[52] U.S. Cl. .................................. 250/282; 250/291; 250/292; 250/293

[58] Field of Search ............... 250/282, 281, 283, 290, 250/293, 286, 291, 292

[56] References Cited

U.S. PATENT DOCUMENTS

| | | | |
|---|---|---|---|
| 3,527,939 | 9/1970 | Dawson et al. | 250/281 |
| 4,540,884 | 9/1985 | Stafford et al. | 250/282 |
| 4,736,101 | 4/1988 | Syka et al. | 250/292 |
| 4,749,860 | 6/1988 | Kelley et al. | 250/282 |
| 5,075,547 | 12/1991 | Johnson et al. | 250/292 |

*Primary Examiner*—Jack I. Berman
*Assistant Examiner*—James Beyer
*Attorney, Agent, or Firm*—Flehr, Hohbach, Test, Albritton & Herbert

[57] ABSTRACT

This invention relates generally to a method of operating an ion trap mass spectrometer to determine the resonant excitation frequencies of trapped ions. This can be achieved by: (1) introducing sample ions into the ion trap volume: (2) adjusting the trapping fields so that parent ions having a mass-to-charge ratio of interest which are to undergo collision induced dissociation (CID) are trapped; (3) applying an excitation voltage of predetermined frequency and amplitude across the end caps of the ion trap; (4) scanning the frequency of the excitation voltage in a first direction and monitoring for ejection of the parent ions; (5) repeating steps (1) through (3) and scanning the frequency of the excitation voltage in an opposite direction and monitoring for ejection of the parent ions; (6) averaging the frequencies at which the ions are ejected; and (7) applying that frequency in a subsequent MS/MS scan to promote CID of the parent ions to form daughter ions.

9 Claims, 2 Drawing Sheets

METHOD OF OPERATING AN ION TRAP MASS SPECTROMETER TO DETERMINE THE RESONANT FREQUENCY OF TRAPPED IONS

This invention relates generally to a method of operating an ion trap mass spectrometer to determine the resonant excitation frequencies of trapped ions, and more particularly to the method of rapidly determining a resonant excitation frequency for optimum ion excitation to effect collision-induced dissociation (CID).

BACKGROUND OF THE INVENTION

In U.S. Pat. No. 4,540,884 there is described a method of mass analyzing a sample by the use of a quadrupole ion trap. Basically, a wide range of ions of interest are created and stored in the ion trap during an ionization step. In one method, the r.f. voltage applied to the ring electrode of the quadrupole ion trap is then increased and trapped ions of consecutively increasing specific masses become unstable and exit the trap. These ions are detected to provide an output signal indicative of the masses of the stored ions.

In U.S. Pat. No. 4,736,101 there is disclosed a method of performing MS/MS in a quadrupole ion trap. In U.S. Pat. No. 3,527,939 there is described a method of isolating a single mass in a quadrupole ion trap. In this method, a combination of AC and DC fields are applied to the ion trap after an ionization step such that only the mass of interest will have stable or bounded trajectories and will remain trapped in the ion trap. All other masses, either above or below the mass of interest, will have unstable trajectories.

In U.S. Pat. No. 4,749,860 there is described a method of isolating ions of selected mass in quadrupole ion traps of the type including a ring electrode and end caps in which r.f. and AC voltages are applied to the ring electrode and end cap and scanned to trap a single ion of interest.

Ions stored within the quadrupole ion trap can be excited by applying an excitation voltage of predetermined frequency across the end caps of the ion trap. Ions that follow orbital trajectories at a frequency resonant with the excitation frequency gain kinetic energy as they absorb AC power. Two possible outcomes of this excitation are that the excited ions leave the confines of the ion trap and are no longer stored, or they undergo dissociation by ion molecule or ion/ion collisions within the trap (collision-induced dissociation).

The ability to assign an excitation frequency accurately so that the ions of a single mass-to-charge ratio may be excited is required for many of the operational modes of ion trap mass spectrometers. Rough excitation frequency assignments are possible by calculation of an ion's frequency of motion from the Mathieu equations for the ideal case of a single ion contained in a perfect quadrupole field. Relationships that account for all the variables affecting the frequency of an ion motion in an imperfect quadrupole field containing numerous ions have not been developed. In practice, the calculated frequency often differs significantly from those required to affect resonant excitation of an ion. Optimum resonant excitation frequencies can be experimentally determined by acquiring MS/MS spectra at a series of frequencies and plotting the results. The user determines the optimum resonant excitation frequency from these data by looking for the scan that shows the largest loss of parent ion signal and the maximum production of daughter ions. This procedure can take as long as fifteen minutes to perform, during which time constant sample conditions must be maintained. Automated programs that follow similar approaches have reduced the time required to obtain such data to a few minutes, but are still limited to continuous sample introduction methods.

For gas chromatography/mass spectrometry/mass spectrometry (GC/MS/MS), frequency assignments must be performed on a millisecond time scale. As the ion population within the trap changes over the chromatographic peak, the optimum resonant excitation frequency shifts.

OBJECTS AND SUMMARY OF THE INVENTION

It is an object of the present invention to provide a method for rapidly determining the resonant excitation frequency of ions trapped in an ion trap mass spectrometer.

It is a further object of the invention to provide a method of performing efficient CID of an ion during rapidly changing sample conditions.

It is another object of the invention to provide a method for operating a quadrupole ion trap mass spectrometer in which the resonant excitation frequency of ions within the trap is assigned in real time.

It is another object to provide a method of assigning and determining the resonant excitation frequency of ions trapped in an ion trap by rapidly scanning an excitation frequency and detecting ejected ions or ion fragments.

It is another object of the invention to provide a method for operating a quadrupole ion trap mass spectrometer in which an ion's frequency of motion is determined so that the associated resonant excitation frequency can be assigned to promote ion activation.

The foregoing and other objects of this invention can be achieved by the method of which includes the steps of:

(1) introducing sample ions into the ion trap volume;

(2) adjusting the trapping fields so that parent ions having a mass-to-charge ratio of interest which are to undergo CID are trapped;

(3) applying an excitation voltage of predetermined frequency and amplitude across the end caps;

(4) scanning the frequency of the excitation voltage in a first direction and monitoring for ejection of the parent ions;

(5) repeating steps (1) through (3) and scanning the frequency of the excitation voltage in an opposite direction and monitoring for ejection of the parent ions;

(6) averaging the frequencies at which the ions are ejected; and (7) applying that frequency in a subsequent MS/MS scan to promote CID of the parent ions to form daughter ions.

Another object of the invention is achieved by the method of operating an ion trap mass spectrometer which comprises the steps of:

(1) adjusting the trapping fields so that ions having a mass-to-charge ratio of interest are trapped;

(2) applying a supplementary excitation voltage of predetermined amplitude across the end caps;

(3) scanning the frequency of the supplementary excitation voltage and monitoring for ejection of excited ions.

BRIEF DESCRIPTION OF THE DRAWINGS

The foregoing and other objects of this invention will be more clearly understood from the following description when read in conjunction with the accompanying drawings, of which.

DETAILED DESCRIPTION OF THE DRAWINGS

Figure 1:
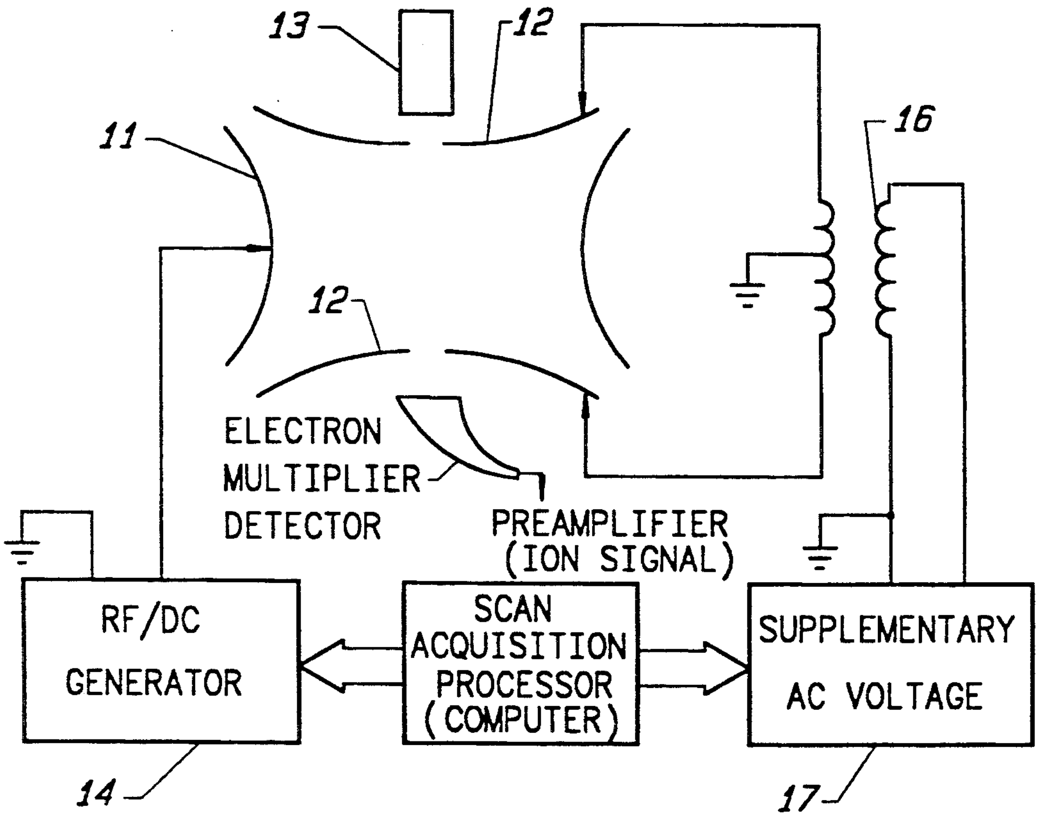
FIG. 1 is a schematic diagram of an ion trap mass spectrometer useful in performing this invention.

Referring to FIG. 1, there is schematically illustrated a quadrupole ion trap which includes a ring electrode 11, spaced end caps 12, and an electron gun 13 for ionizing samples introduced into the trap as, for example, from a gas chromatograph or other sample source (not shown). Alternatively, the electron gun 13 may be an external ionizer (ionization source) that injects externally formed sample ions into said trap. In the following description, both methods are referred to as introducing ions into the ion trap. Suitable voltages are applied to the ring electrode 11 via the amplifier and r.f./DC generator 14. Axial modulation voltages are applied across the end caps 12 from the supplementary AC voltage generator 17 to the transformer 16, whose secondary is connected across the end caps. A scan acquisition processor (computer) controls the application and amplitude of the voltages applied to the ion trap electrodes.

With this invention, as described above, the resonant excitation frequency/ion excitation relationship can be obtained in real time in the following sequence. The gaseous sample ions are introduced in the trap at a selected r.f. voltage that determines the minimum mass-to-charge ratio stored within the ion trap volume. A secondary AC voltage is applied across the end caps of the analyzer at a predetermined frequency as, for example, 100 kHz. Next, the frequency of this AC voltage is scanned with sufficient amplitude ($6V_{p-p}$) to promote ejection of ions as they fall into resonance with the scanning excitation frequency. Throughout the frequency scan, the ejected ion signal is recorded with the preamplifier circuit and data acquisition software. Display of the ion signal versus the applied resonant excitation frequency reveals the correlation between ions of various mass-to-charge ratios and the frequencies at which they were excited. By scanning the frequency up and down and averaging, the optimum excitation frequency for each ion is obtained.

Figure 2:
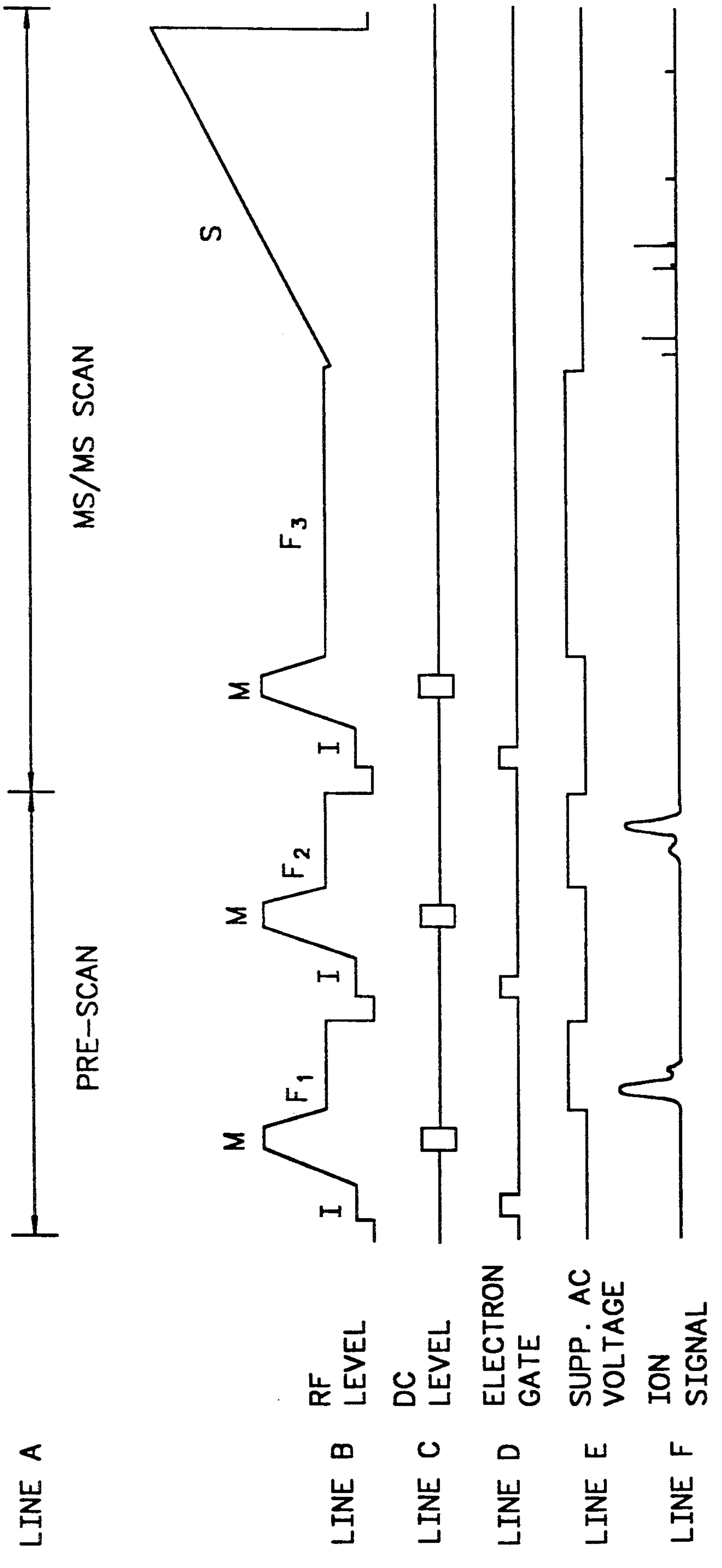
FIG. 2 is a timing diagram illustrating operation of the ion trap in accordance with this invention.

In accordance with this invention and as described above, the optimum resonant excitation frequency is determined in real time by the step of ionizing the sample with a preselected r.f. frequency at a voltage level which determines the low mass cutoff. The r.f. level is shown in FIG. 2, line B at (I). The electron gun is gated by the gating pulse, line D. The ion of interest is then selected by a mass isolation step which consists of the application of a combination of r.f. and DC voltage line C applied to the ring electrode to isolate the mass-to-charge ratio interest (M). The r.f. level is adjusted to shift the parent ion to Mathieu parameter $q=0.3$ in the stability diagram envelope for a quadrupole ion trap where CID is typically performed ($F_1$). Following the mass isolation step a supplementary AC voltage of predetermined amplitude from generator 17, line E, is applied between the end caps. The frequency of the AC voltage is scanned from 115 kHz to 122 kHz at a constant amplitude and at a predetermined sweep rate, as for example 600 kHz per second. This frequency range corresponds to a 1.7 amu wide window at $q=0.3$. The frequency is selected by calculating a rough excitation frequency and then scanning above and below that frequency. Throughout the frequency scan, the output from the preamplifier, line F, is acquired and temporarily stored in a computer. The first scan and output is illustrated in the first part of the prescan, FIG. 2, line A. A second frequency prescan is then performed with identical ionization and mass selection steps. The frequency is scanned down from 122 kHz to 115 kHz. The output from the preamplifier is stored in the computer. An algorithm locates the frequency corresponding to the maximum ejected ion current for each temporary data set and provides two ejection frequencies. The difference between these two frequencies reflects the width of the resonant band, typically 1 kHz at such a high resonant excitation amplitude. The average of these two values is calculated and used as the optimum resonant excitation frequency $F_3$ for performing the CID in the actual MS/MS scan, FIG. 2. The total time required to perform the frequency prescan including two ionization periods, two mass selection periods, two frequency scan periods and subsequent calculations in less than 100 ms. Thus, it is possible, during a gas chromatographic peak, to select the optimum CID frequency rapidly and permit analysis of the selected parent ion of interest.

Referring to FIG. 2, following the prescanns the MS/MS scan is performed line A. The sample is again ionized, mass selected, and then the optimum excitation frequency $F_3$ is applied at a value which assures CID and minimizes ejection. This is followed by increasing the r.f. voltage S, line B, to sequentially render daughter ions formed by CID unstable, whereby they leave the ion trap and are detected, line F.

There has been provided a method of operating an ion trap mass spectrometer in which the process of assigning the resonant excitation frequency of ions within the trap is performed in real time. The technique uses two rapid prescans from which the frequency for optimum ion excitation is determined. The method is particularly suitable in MS/MS experiments where parent ions are excited to undergo collision induced dissociation.

What is claimed is:

1. A method of rapidly measuring the frequency of ion motion in the quadrupole ion trap mass spectrometer having a ring electrode and end caps defining a trapping field which comprise the steps of introducing ions into the trap, adjusting the trapping field so that ions having a mass-to-charge ratio of interest are trapped, applying a supplementary excitation voltage of predetermined amplitude across the end caps, scanning the frequency of the supplementary excitation voltage, and simultaneously monitoring for the ejection of excited ions and determining the frequency of ion motion at the point of ejection from said ion trap.

2. A method of operating an ion trap mass spectrometer of the type which includes a trapping volume defined by a ring electrode and end caps to determine the frequency of ion motion which comprises the steps of introducing sample ions into the trapping volume, applying r.f. and DC voltage to said ring electrode to trap ions having a mass-to-charge ratio of interest, applying an excitation AC voltage across the end caps and scanning the frequency of said voltage in a first direction to cause ions of interest to be ejected, detecting said ejected ions and determining their frequency of ejection, again introducing sample ions into said trapping volume and applying r.f. and DC voltages to trap ions having mass-to-charge ratio of interest, applying an excitation AC voltage across the end caps and scanning the frequency of said voltage in an opposite direction to cause ions of interest to be ejected, detecting said ejected ions and determining their frequency at the point of ejection, and averaging the two frequencies for each ion of interest to determine the excitation frequency of each ion.

3. The method as in claim 1 in which the r.f. and DC voltages are adjusted to trap parent ions of interest.

4. The method as in claim 2 in which the r.f. and DC voltages are adjusted to trap parent ions of interest.

5. The method as in claims 3 or 4 including the additional steps of introducing sample ions in said ion trap, adjusting the r.f. and AC voltages to trap said parent ions of interest, applying a voltage across said end caps at said determined frequency to cause said parent ions to undergo collision-induced dissociation to form daughter ions and changing increasing the r.f. voltage to cause daughter ions of consecutive mass to escape said trap volume for detection.

6. A method of operating an ion trap mass spectrometer which includes a ring electrode and end caps defining an ion trap volume to effect collision-induced dissociation in real time which comprise the steps of:

introducing sample ions into ion trap volume at an r.f. voltage;

adjusting the trapping field applied to the trap to trap parent ions of interest;

applying an excitation voltage across the end caps and scanning the frequency of said voltage to cause the parent ions of interest to be ejected, detecting said parent ions and determining their frequency at the point of ejection;

subsequently repeating the ion introduction and ion trapping steps, applying an excitation voltage across the end caps and scanning the frequency in an opposite direction to cause the parent ions of interest to be ejected, detecting said ions and determining their frequency at the point of ejection, and averaging the two determined frequencies to obtain an optimum excitation frequency for each ion.

7. The method as in claim 6 in which said ion of interest is a parent ion, including the additional step of introducing sample ions, adjusting the fields to capture the parent ion of interest, applying the optimum excitation frequency across the end caps to excite the parent ion to cause collision-induced dissociation to form daughter ions, and changing the quadrupole field to cause daughter ions of consecutive mass to escape said trapped volume for detection.

8. The method as in claim 6 wherein an estimated resonant frequency is theoretically calculated and wherein the frequency of said scanning voltage frequency is selected to extend above and below said estimated resonant frequency of said parent ions and of a magnitude which ejects said ions prior to collision-induced disassociation.

9. The method as in claims 7 or 8 in which the r.f. voltage is selected to shift the parent ions to Mathieu parameter $q=0.3$ on the stability envelope for a quadrupole ion trap prior to the application of the optimum excitation frequency.

* * * * *